US010078313B2

(12) United States Patent
Girardey

(10) Patent No.: US 10,078,313 B2
(45) Date of Patent: Sep. 18, 2018

(54) FIELD DEVICE FOR DETERMINING OR MONITORING A PROCESS VARIABLE IN AUTOMATION TECHNOLOGY

(71) Applicant: Endress + Hauser GmbH + Co. KG, Maulburg (DE)

(72) Inventor: Romuald Girardey, Blotzheim (FR)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 587 days.

(21) Appl. No.: 14/647,506

(22) PCT Filed: Oct. 29, 2013

(86) PCT No.: PCT/EP2013/072566
§ 371 (c)(1),
(2) Date: May 27, 2015

(87) PCT Pub. No.: WO2014/082806
PCT Pub. Date: Jun. 5, 2014

(65) Prior Publication Data
US 2015/0316899 A1 Nov. 5, 2015

(30) Foreign Application Priority Data

Nov. 28, 2012 (DE) .......................... 10 2012 111 518
Jan. 9, 2013 (DE) .......................... 10 2013 100 159

(51) Int. Cl.
*G05B 9/02* (2006.01)
*G05B 9/03* (2006.01)

(52) U.S. Cl.
CPC ........ *G05B 9/03* (2013.01); *G05B 9/02* (2013.01)

(58) Field of Classification Search
CPC ........................................................ G05B 9/03
(Continued)

(56) References Cited

U.S. PATENT DOCUMENTS 3,725,818 A * 4/1973 Nurmohamed ...... G05D 1/0077
327/403
4,590,579 A * 5/1986 Erb ........................ G01N 23/12
327/100
(Continued)

FOREIGN PATENT DOCUMENTS

DE 19517492 A1 11/1996
DE 102009026785 A1 8/2010
(Continued)

OTHER PUBLICATIONS

English Translation of International Preliminary Report on Patentability, WIPO, Geneva, dated Jun. 11, 2015.
(Continued)

*Primary Examiner* — Son Mai
(74) *Attorney, Agent, or Firm* — Bacon & Thomas, PLLC

(57) ABSTRACT

A field device for determining or monitoring a process variable in automation technology. The field device meets a safety standard, which is required in a predetermined safety-critical application, comprising: a sensor, which works according to a defined measuring principle; and a control/evaluation unit, which processes and evaluates measurement data delivered by the sensor along at least three redundant and/or diversely designed measurement channels, wherein a redundant analog electrical current interface is provided, via which an electrical current representing the process variable is settable in a two-wire line. The analog electrical current interface is designed triply redundantly wherein the following components are associated with the analog electrical current interface: three electrical current setting channels connected in parallel, a doubly redundant voter, which detects a malfunction in one of the measurement channels and/or the electrical current setting channels a doubly redundant turn off stage, via which a measurement channel, respectively an electrical current setting channel, is turned
(Continued)

off, when the voter detects a malfunction in the measurement channel or in the electrical current setting channel.

15 Claims, 7 Drawing Sheets

(58) Field of Classification Search
USPC .......................................................... 700/79
See application file for complete search history.

(56) References Cited

U.S. PATENT DOCUMENTS

| | | | | |
|---|---|---|---|---|
| 5,428,769 | A * | 6/1995 | Glaser | G05B 9/03 700/4 |
| 5,505,782 | A * | 4/1996 | Stauffer | B01J 4/02 118/715 |
| 7,130,703 | B2 | 10/2006 | Ott et al. | |
| 8,209,591 | B2 * | 6/2012 | Satterfield | G06F 11/267 714/760 |
| 8,612,920 | B2 | 12/2013 | Girardey et al. | |
| 2011/0202163 | A1 * | 8/2011 | Kim | G21D 3/04 700/110 |
| 2015/0177707 | A1 * | 6/2015 | Girardey | G05B 9/03 700/79 |

FOREIGN PATENT DOCUMENTS

| | | |
|---|---|---|
| DE | 102009028938 A1 | 3/2011 |
| WO | 2004013585 A1 | 2/2004 |
| WO | 2009062954 A1 | 5/2009 |
| WO | 2010086073 A1 | 8/2010 |
| WO | 2011158120 A2 | 12/2011 |

OTHER PUBLICATIONS

International Search Report,, EPO, The Netherlands, dated Apr. 30, 2014.

German Search Report, German PTO, Munich, dated Jul. 16, 2013.

* cited by examiner

FIELD DEVICE FOR DETERMINING OR MONITORING A PROCESS VARIABLE IN AUTOMATION TECHNOLOGY

TECHNICAL FIELD

The invention relates to a field device for determining or monitoring a process variable in automation technology. The field device is so embodied that it meets a safety standard required in a predetermined safety-critical application. Furthermore, the field device includes a sensor, which works according to a defined measuring principle, and a control/evaluation unit, which processes and evaluates measurement data delivered by the sensor along at least three redundant and/or diversely designed measurement channels.

BACKGROUND DISCUSSION

A corresponding solution is known from published international application, WO 2004/013585 A1. Applied in automation technology, especially in process automation-technology, are field devices, which serve for determining and monitoring process variables. Examples of such field devices are fill level measuring devices, flow measuring devices, analytical measuring devices, pressure and temperature measuring devices, moisture and conductivity measuring devices, density and viscosity measuring devices. The sensors of these field devices register the corresponding process variables, e.g. fill level, flow, pH-value, substance concentration, pressure, temperature, moisture, conductivity, density and viscosity.

The terminology 'field devices' includes in connection with the invention, however, also actuators, e.g. valves or pumps, via which, for example, the flow of liquid in a pipeline or the fill level in a container is changeable. A large number of such field devices are manufactured and sold by members of the firm, Endress+Hauser.

As a rule, field devices in modern automation technology plants are connected via communication networks, such as HART-multidrop, point to point connection, Profibus, Foundation Fieldbus, with a superordinated unit, for instance a control system or control room. This superordinated unit serves for process control, for process visualizing, for process monitoring as well as for start-up and for servicing the field devices. For the operation of fieldbus systems, necessary supplemental components, which are connected directly to a fieldbus and which serve especially for communication with the superordinated units, are likewise frequently referred to as field devices. These supplemental components include e.g. remote I/Os, gateways, linking devices, controllers or wireless adapters.

Depending on application, the field devices must satisfy the most varied of safety requirements. In order to meet the respective safety requirements, e.g. the IEC61508 safety integrity level (SIL standard), the field devices must be redundantly and/or diversely designed.

Redundancy means increased safety through doubled or multiple design of all safety relevant, hardware and software components. Diversity means that the hardware components located in the different measurement channels, such as e.g. a microprocessor, be from different manufacturers and/or be of different type. In the case of software components, diversity requires that the software stored in the microprocessors originate from different sources, e.g from different manufacturers, respectively programmers. Via all these measures, it should be assured that a safety critical failure of the field device as well as the occurrence of simultaneously arising systematic failures in the providing of measured values be excluded with high probability.

An example of a safety-relevant application is fill level-monitoring in a tank, in which a flammable or even a nonflammable but water-endangering liquid is stored. In such case, it must be assured that the supply of liquid to the tank is immediately interrupted, as soon as a maximum permitted fill level is achieved. This, in turn, assumes that the measuring device highly reliably detects fill level and works faultlessly.

While in the case of known solutions the measurement channel is redundantly and/or diversely designed, nevertheless, the voter, usually a microprocessor, represents the Achilles' heel of a field device, which should satisfy high and highest safety requirements. The microprocessor is monolithically embodied. If there is here a dangerous failure (corresponding to the nomenclature of the above mentioned standard), then the field device fails. In order to fulfill the requirements of SIL 3, the fraction of dangerous failures to the total of all possible failures must lie at a maximum of one percent. With a conventional microprocessor, this safety level cannot be achieved.

In order to solve this problem, in the non-prepublished German application, DE 10 2012 106 652.3, filed on Jul. 23, 2012, a field device is described, whose voter is embodied as a majority voter and includes three stages:
  a comparator stage, which compares the output signals delivered by the individual measurement channels with one another;
  a failure recognition stage, which detects by suitable combining of the output signals of the comparator stage a failure occurring in a measurement channel, and
  an output selection stage.

The content of the German application, DE 10 2012 106 652.3 is incorporated here by reference, especially as regards the voter.

Still, no field device is known, which fulfills the high safety level also in the region of the electrical current output module e.g. in the case of a 4-20 mA two or four wire, field device.

SUMMARY OF THE INVENTION

An object of the invention is to provide a field device, which is distinguished by increased functional safety.

The object is achieved by a field device for determining or monitoring a process variable in automation technology, wherein the field device meets a safety standard, which is required in a predetermined safety-critical application, comprising: a sensor, which works according to a defined measuring principle; and a control/evaluation unit, which processes and evaluates measurement data delivered by the sensor along at least three redundant and/or diversely designed measurement channels, and
wherein a redundant analog electrical current interface is provided, via which an electrical current representing the process variable is settable in a two-wire line, wherein the analog electrical current interface is designed triply redundantly and wherein the following components are associated with the analog electrical current interface:
  three electrical current setting channels connected in parallel,
  a doubly redundant voter, which detects a malfunction in one of the measurement channels MK and/or the electrical current setting channels,
  a doubly redundant turn off stage, via which a measurement channel, respectively an electrical current setting channel, is turned off, when the voter detects a malfunction in the measurement channel or in the electrical current setting channel.

In a preferred embodiment of the field device of the invention, each electrical current setting channel includes an electrical current setting unit and an electrical current controller, wherein the electrical current setting unit and the electrical current controller are connected in parallel.

Furthermore, it is provided that the voter is composed of a plurality of components, which are at least partially or completely doubly redundantly designed.

Especially, it is provided that the voter is a majority voter, which has a plurality of voter channels, wherein each voter channel contains components as follows: A comparator stage, via which output signals delivered by the individual electrical current setting channels are compared with one another; a failure detection stage, which by suitable combining of the output signals of the comparator stages associated with the voter channels detects a malfunction occurring in a measurement channel or in an electrical current setting channel; and a turn off stage, which turns off the electrical current setting channel, in which the failure detection stage detects a malfunction.

An advantageous further development of the field device of the invention provides that each voter channel includes a part of the comparator stage, a part of the failure detection stage and a part of the turn off stage, and that each voter channel is embodied as an integrated component of the associated measurement channel and of the associated electrical current setting channel.

Moreover, it is provided that the comparator stage for each voter channel has two comparator modules, which compare the output signals of the associated electrical current setting channel with the output signals of the remaining electrical current setting channels.

Preferably, each of the failure detection stages is a logic stage, which is constructed of two NAND gates, wherein applied to the inputs of the first NAND gate are the output signals of the comparators of a first voter channel, which is associated with a selected measurement channel, and wherein applied to the second NAND gate are the output signals of the comparators of the second voter channel and the third voter channel redundant to the inputs of the first NAND gate, and wherein the output signals of the first NAND gate and the second NAND gate form the control signals for the downstream turn off stage.

Preferably, each measurement channel, respectively each electrical current setting channel, has its own voltage supply. This embodiment has the advantage that it in the case of loss of one of the voltage supplies there is no total failure of the field device.

Especially advantageous is when an alarm electrical current module is provided, which is so embodied that it sets a failure current, e.g. of 22 mA, when in at least two measurement channels, respectively in two electrical current setting channels, malfunctions occur simultaneously. In this way, it is prevented that the electrical current interface is unstable.

Furthermore, it is provided that the control/evaluation unit with measurement channels, respectively electrical current setting channels, and the associated components of the voter, respectively the voter channels, is at least partially embodied in the measurement channels, respectively in the electrical current setting channels, as a reconfigurable logic chip with a number of partially dynamically reconfigurable function modules.

Moreover, a reconfiguration control is provided, which so configures function modules in the measurement channels or the electrical current setting channels as a function of the respectively defined, safety-critical application that the field device meets the required safety standard.

Especially, there is associated with the reconfiguration control at least one microprocessor, which partially dynamically reconfigures the function modules of a measurement channel or an electrical current setting channel, in which a failure is detected.

It is further provided in connection with the invention that at least one of the measurement channels and/or the electrical current setting channels is configured analog-based in an FPAA.

It is supplementally provided that the individual measurement channels or electrical current setting channels are so spaced from one another that a temperature- and/or a stress or voltage change in a measurement channel or electrical current setting channel has no influence on a neighboring measurement channel or electrical current setting channel.

Preferably, the at least one microprocessor is permanently configured in a static region of the logic chip.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
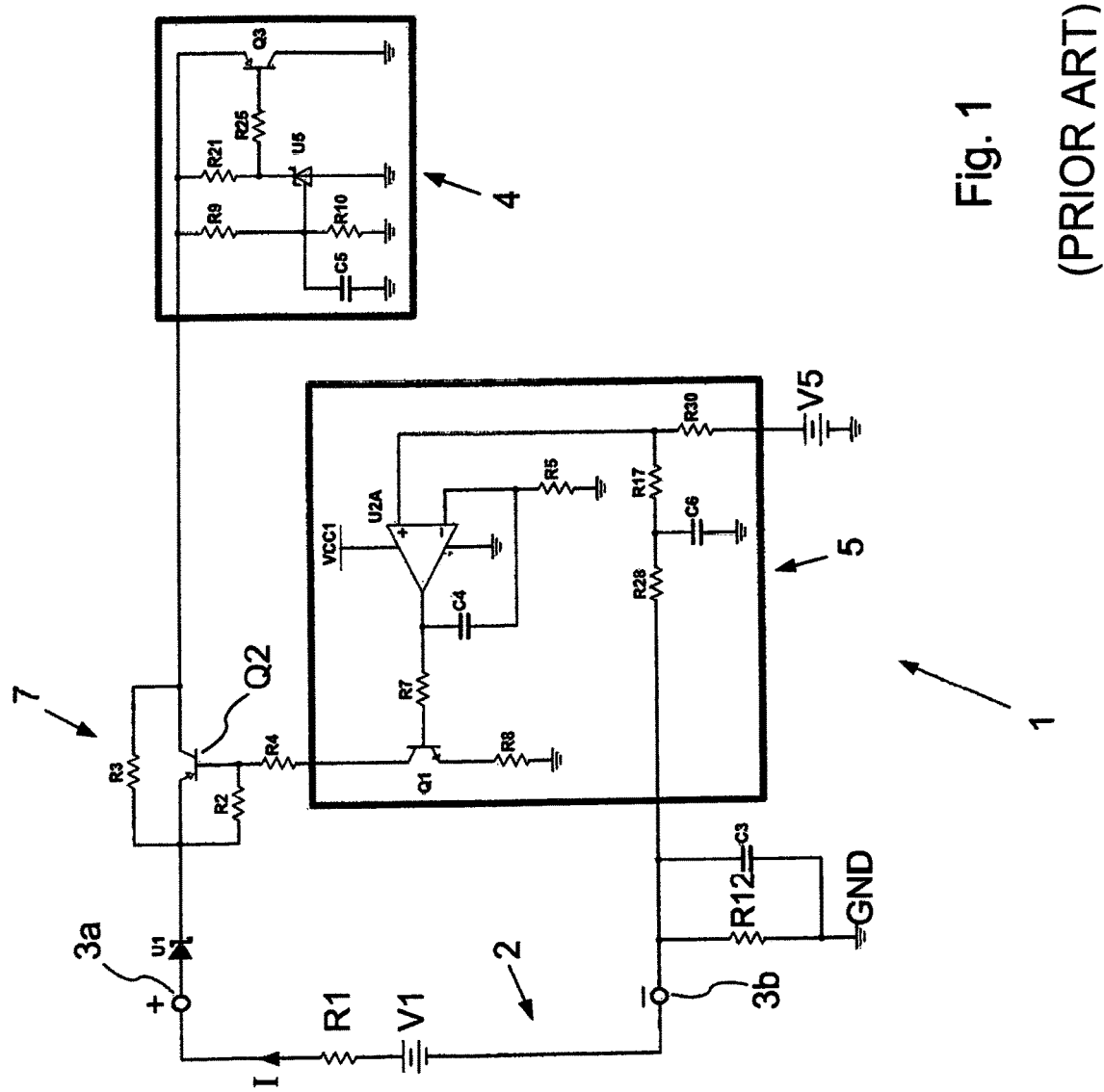
FIG. 1 is a block diagram of an electrical current output module known from the state of the art.

FIG. 1 shows a block diagram of an analog, electrical current, output module 1 known from the state of the art. The electrical current output module 1 impresses an electrical current I on an electrical current loop 2, respectively a two-wire line. Via the electrical current loop 2, the field device, respectively, here, the measuring device, composed of sensor S and a control/evaluation unit 6, is connected with a remotely arranged evaluation/output unit. Field devices, respectively, here, measuring devices, for determining or monitoring a process variable in automation technology register the process variable and send the registered measured values via the electrical current loop 2 or via a digital communication to a receiving unit, e.g. the already mentioned evaluation/output unit.

The electrical current I flowing in the electrical current loop 2 is so set via an electrical current controller 5 and an electrical current setting unit 7 that the set electrical current I represents the ascertained process- or manipulated variable uniquely and with high accuracy. Usually the 4-20 mA standard is used in automation technology. In such case, an electrical current of 4 mA in the electrical current loop represents e.g. the minimum value of the process variable and an electrical current of 20 mA e.g. the maximum value of the process variable. The 4-20 mA technology is largely disturbance resistant, is applicable in the explosion-endangered areas and is frequently used in industrial applications.

Established in automation technology is so-called two conductor technology, in the case of which the electrical current loop 2 transmits not only the measured or actuating values but also supplies the sensor/actuator with energy. Thus, only a limited power is available to the field device for the measuring/control task. This power depends on the supply voltage and the electrical current representing the current measured value/actuating value. In order to assure a continued availability of the field device, conventional field devices are so designed that they manage with the minimally available power, i.e. they require for measurement- or control operation only the power present at minimum electrical current and minimum voltage. If more power is available, this additional power is usually converted in an electrical current sink 4 into power loss.

The electrical current output module 1 shown in FIG. 1 is implemented, for example, in a 4-20 mA transmitter, thus in the electronics part, of a field device. The electrical current output module 1 supplies the electrical current I, which flows through the electrical current loop 2. The electrical current I is represented by the voltage source V1 and the resistor R1—to the left of the positive connection 3a and the negative connection 3b. The voltage source V5 represents the desired value of the electrical current loop control 5.

The transistor Q2 of the electrical current setting unit 7 controls the electrical current, which flows from the positive connection 3a to the electrical current sink 4. The electrical current sink 4 lies at reference potential, preferably at ground GND. The electrical current flows to the negative connection 3b via the measuring resistor R12. In this way, a voltage is produced between the negative connection and ground GND, which is proportional to the flowing electrical current. This voltage is used as reference voltage for controlling the transistor Q2 and, thus, for setting the electrical current in the electrical current loop 2. The control of the set electrical current occurs via the electrical current loop control 5. Centerpiece of the electrical current loop control 5 is the operational amplifier U2A. The operational amplifier U2A controls the transistor Q1 and also the transistor Q2 in such a manner that at the plus output of the operational amplifier U2A the sum of the voltages equals zero. If this condition is fulfilled, then the electrical current I through the measuring resistor R12 and in the electrical current loop 2 is proportional to the desired value, which is represented by the voltage V5.

If the energy supply of the field device occurs via the same electrical current loop 2, which is also used for supplying the measured or actuating values of the field device, then the electrical current sink 4 serves to drain the electrical current not required by the field device to ground GND and, thus, to convert it into power loss. If the energy supply of the field device occurs via a separate electrical current line, then the electrical current sink 4 can be omitted, respectively it can be replaced by a short circuit.

Figure 2:
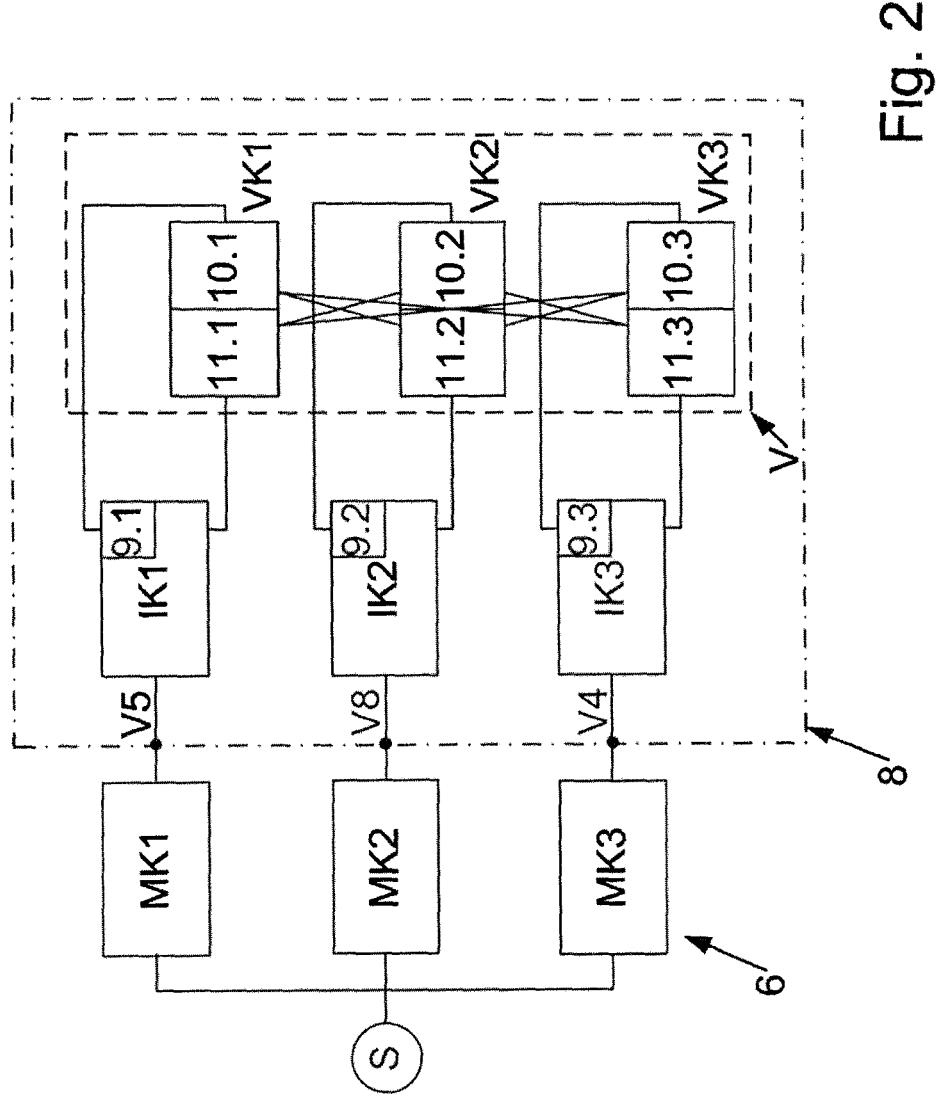
FIG. 2 is a schematic representation of a form of embodiment of the field device of the invention with sensor, triply redundant measurement channels, triply redundant electrical current setting channels, doubly redundant voter channels and doubly redundant turn off stages.

FIG. 2 shows a schematic representation of the field device of the invention with a sensor S, triply redundant measurement channels MK1, MK2, Mk3, triply redundant electrical current setting channels IK1, IK2, IK3 and triply redundant voter channels VK1, VK2, VK3. The voter V comprises the voter channels VK1, VK2, VK3, wherein associated with the voter channels VK1, VK2, VK3 are at least parts of the comparator stages 11.1, 11.2, 11.3, the failure detection stages 10.1, 10.2, 10.3 and the turn off stages 9.1, 9.2, 9.3. The redundant analog electrical current interface 8 includes the electrical current setting channels IK1, IK2, IK3 and the voter channels VK1, VK2, VK3.

Figure 3:
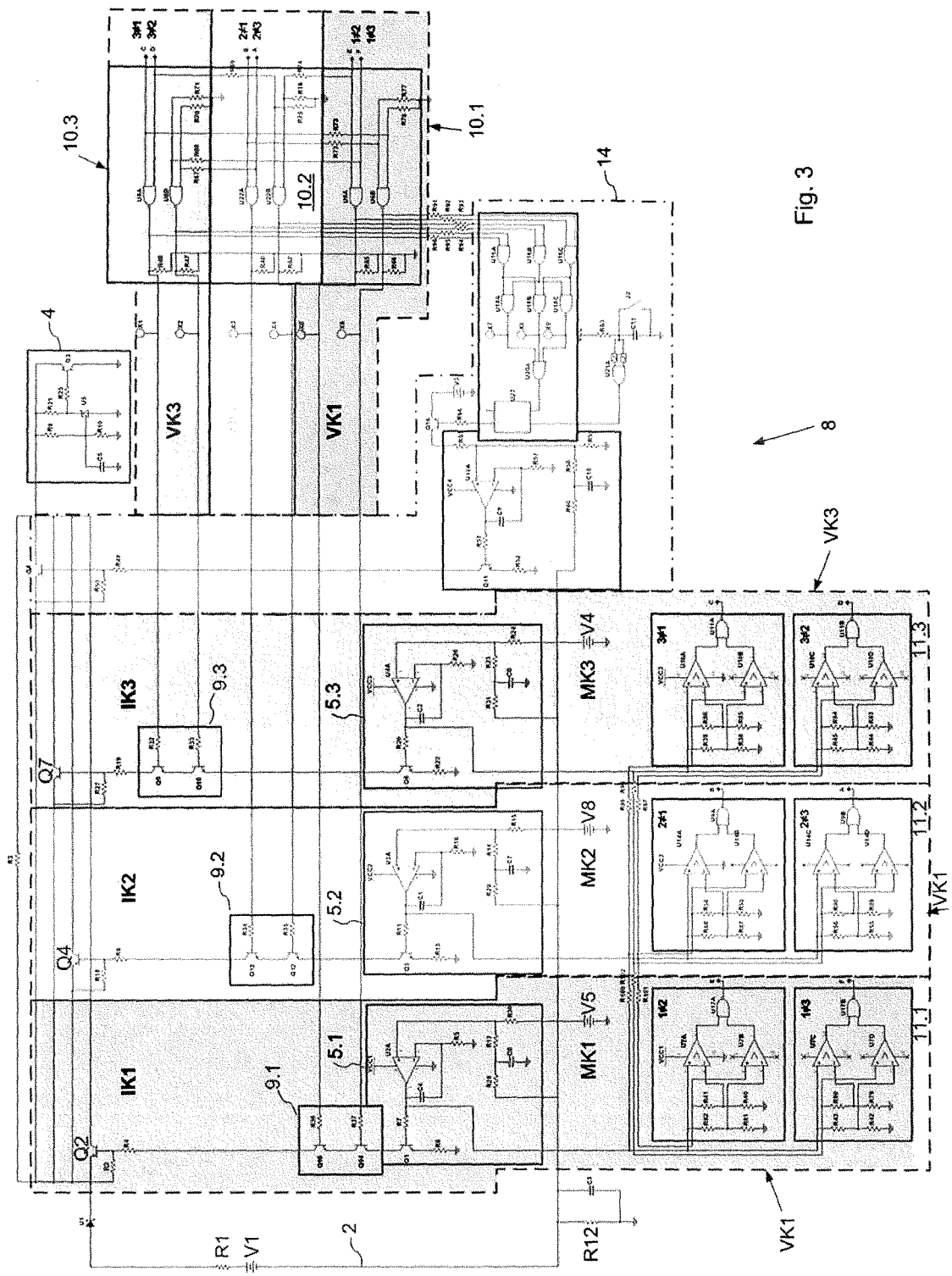
FIG. 3 is a preferred embodiment of a redundant electrical current interface with redundant voter applicable in the case of the field device of the invention.

FIG. 3 shows a preferred embodiment of a redundant electrical current interface 8 with safe redundant voter V applicable in the case of the field device of the invention. The field device of the invention and especially the analog electrical current interface 8 are so embodied that they satisfy the high safety requirements in a desired safety-critical application, e.g. SIL 3. The voltage V1 and the resistor R1 represent the voltage supply, via which the 4-20 mA electrical current loop 2 is supplied with energy. For example, the voltage supply is integrated in a remotely arranged output/evaluation unit, e.g. a PLC.

Not concretely shown in FIG. 3 is the control/evaluation unit 6, which processes and evaluates the output signals V5, V8, V4 delivered by the sensor S (in the case of a sensor S, the output signals V5, V8, V4 represent, especially, measured values) along at least three redundant and/or diversely designed measurement channels MK1, MK2, MK3. The essential components of the electrical current interface 8 of the invention shown in FIG. 3 are shown and described in detail in the following figures FIGS. 4-7.

The embodiment shown in FIG. 3 for the redundant electrical current interface 8 of the invention, via which an electrical current I representing the process variable is set on the electrical current loop 2, includes components as follows:
- three electrical current setting channels IK1, IK2, IK3 connected in parallel (see FIG. 4);
- a doubly redundant voter V, which detects a malfunction in one of the measurement channels MK1, MK2, MK3 and/or one of the electrical current setting channels IK1, IK2, IK3 (see FIG. 6);
- a triply redundant turn off stage 9.1, 9.2, 9.3, via which an electrical current setting channel IK1, IK2, IK3 is turned off, when the voter V detects a malfunction Fch1, Fch2, Fch3 in the measurement channel MK1, MK2, MK3 or in the associated electrical current setting channel IK1, IK2, IK3 (see FIG. 5);
- an alarm electrical current module 14, which sets an alarm electrical current, when a malfunction Fch occurs simultaneously in at least two measurement channels MK1, MK2, MK3 and/or electrical current setting channels IK1, IK2, IK3 (see FIG. 7).

Figure 4:
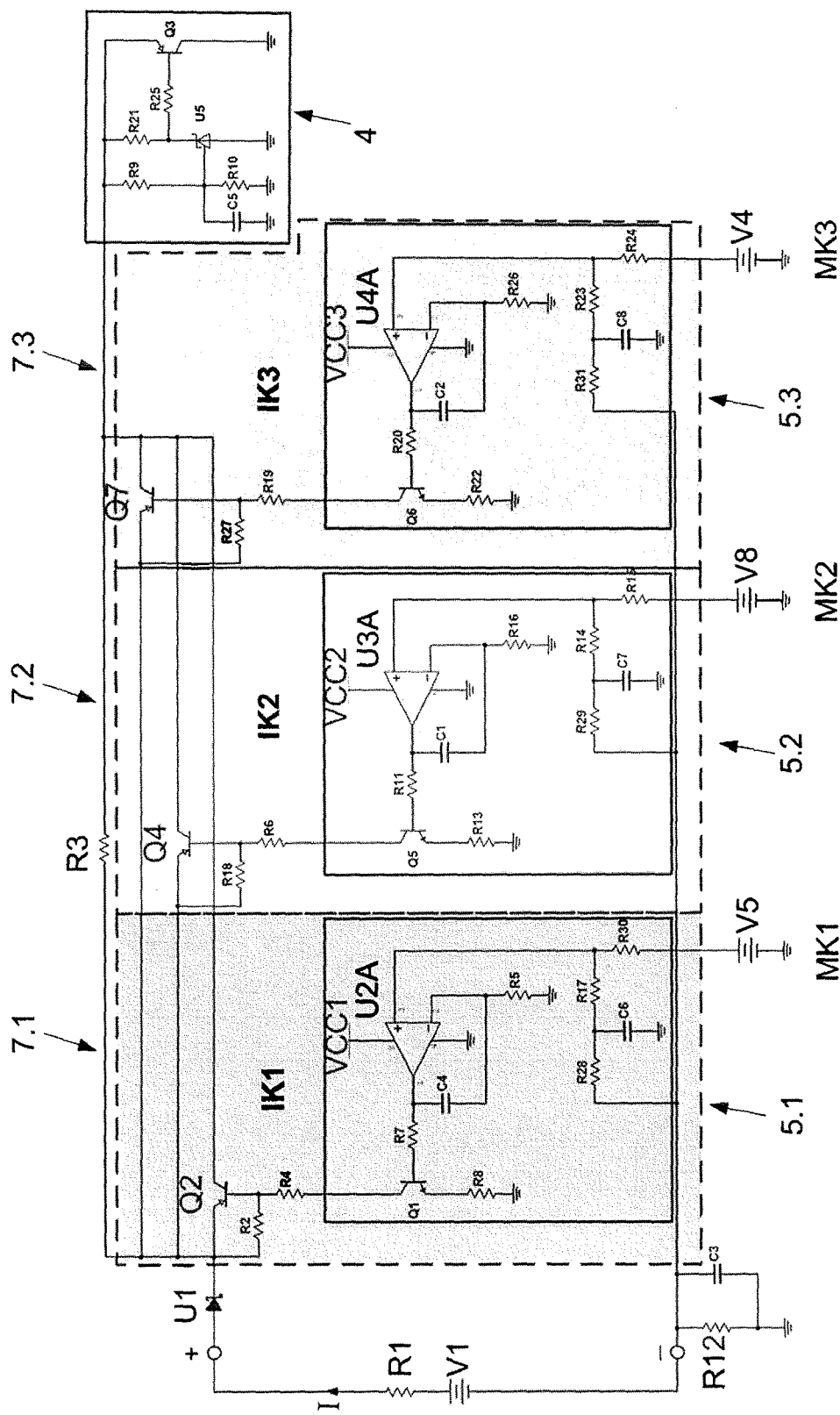
FIG. 4 is an enlarged view of the electrical current interface of the invention of FIG. 3.

The analog, redundantly designed, electrical current interface 8 is shown and described in FIG. 4 in detail in enlarged view. The setting of the electrical current I occurs via the parallel transistors Q2, Q4, Q7 associated with the electrical current setting units 7.1, 7.2, 7.3. The desired values for the turning-on of the transistors Q2, Q4, Q7 by the three parallel electrical current loop controls 5.1, 5.2, 5.3 correspond to the output signals V5, V8, V4 of the three measurement channels MK1, MK2, MK3 (not detailed in FIG. 4). Via the transistors Q2, Q4, Q7, the electrical current is controlled, which is converted in the electrical current sink 4 into power loss.

In the illustrated case, each of the operational amplifiers U2A, U3A, U4A of the electrical current loop controls 5.1, 5.2, 5.3 has its own voltage supply VCC1, VCC2, VCC3. This embodiment has the advantage that, in the case of loss of one of the voltage supplies, no total failure of the field device occurs.

The shading in FIG. 4 indicates the associating of the individual components of the analog electrical current interface 8 to the three electrical current setting channels IK1, IK2, IK3. The shading is maintained in the subsequent figures and in FIG. 3. The shading also indicates the different channels, wherein each channel preferably has its own voltage supply. Components, which are not redundantly designed, include the resistor R12 and the diode U1, which assures that electrical current can only flow in the desired direction. In the illustrated case, there is likewise only one electrical current sink 4; however, the electrical current sink 4 can, same as the other components of the analog electrical current interface 8, also be triply redundantly designed, wherein the current sinks 4 are then connected in parallel. This increases safety also in this part of the circuit.

In the case of the circuit shown in FIG. 4, the output current I, which flows in the electrical current loop 2, is automatically predetermined via the electrical current setting channel IK, in which the greatest electrical current is set. The circuit is, so-to-say, so designed that the electrical current setting channel IK with the greatest set electrical current wins. The field device of the invention has, as a whole, the accuracy of the measurement channel MK, which processes and evaluates the measured values/actuating values with the least accuracy. Usually, this measurement channel is the analog measurement channel MK. If there is a malfunction in one of the measurement channels MK or in one of the electrical current setting channels IK, then the corresponding electrical current setting channel IK sets an incorrect electrical current. If this incorrect electrical current is higher than the electrical current set in the two correctly set electrical current setting channels IK, then the incorrect electrical current is set in the electrical current loop 2 and the field device delivers an incorrect measured value. As a result of the incorrectly set electrical current value, an incorrect measured value/actuating value is transmitted on the electrical current loop. In order to assure the desired high safety rating even in the case of occurrence of a malfunction Fch, a turn off stage 9.1, 9.2, 9.3 is associated with each electrical current setting channel IK1, IK2, IK3, respectively each electrical current setting unit 7.1, 7.2, 7.3.

Figure 5:
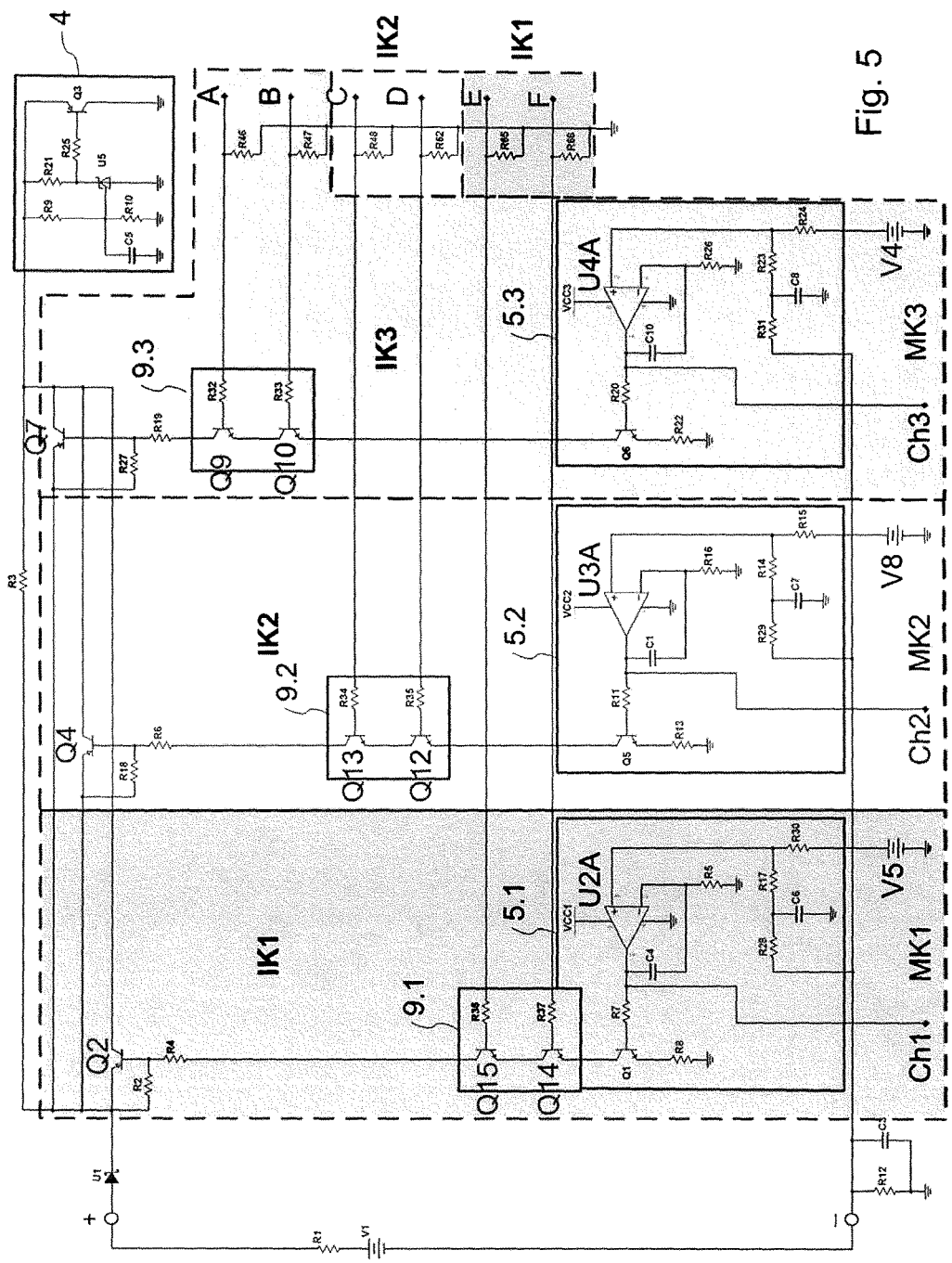
FIG. 5 is an enlarged view of the electrical current interface of the invention with the associated turn off stages for the electrical current setting channels of FIG. 3.

The turn off stages 9.1, 9.2, 9.3 are shown in FIG. 5 supplementally to the electrical current controllers 5.1, 5.2, 5.3 and the electrical current setting units 7.1, 7.2, 7.3. The turn off stages 9.1, 9.2, 9.3 are controlled from the voter V by the signals A, B, C, D, E, F. As soon as the voter V detects a malfunction Fch in a measurement channel MK1, MK2, MK3 or in an electrical current setting channel IK1, IK2, IK3 (this is the case, when the corresponding measured- or electrical current setting channel MK, IK produces an output signal, which deviates from the output signals of the two remaining measurement channels MK or electrical current setting channels IK), then the voter V brings about via the output signals A, B, C, D, E, F the turning off of the defective electrical current setting channel IK. The turn off stages 9.1, 9.2, 9.3 are doubly redundantly embodied in each of the measuring/electrical current setting channel MK, IK, since the voter V is doubly redundantly embodied in each of the measuring/electrical current setting channels MK, IK.

Preferably, each turn off stage 9.1, 9.2, 9.3 is composed from simple transistors Q9, Q10; Q12, Q13; Q14, Q15, which interrupt the control signal, and, thus, the base current, of the transistors Q2, Q4, Q7 responsible for the electrical current control. As soon as the base current is interrupted, the transistor Q2, Q4, Q7 becomes open, and no electrical current flows in the electrical current loop 2. The two remaining electrical current setting channels IK undertake, then, seamlessly, the function of setting the electrical current on the electrical current loop 2; the setting of the electrical current on the electrical current loop 2 occurs automatically via one of the remaining electrical current setting channels IK.

The assumption of the setting function by one of the remaining electrical current setting channels IK can be utilized in the following way: As evident from FIG. 5, especially, however, from FIG. 6, two transistors Q14, Q15; Q12, Q13; Q9, Q10 are arranged in each turn off stage 9.1, 9.2, 9.3. In this way, it is possible for the voter V to turn off the electrical current setting channels IK1, IK2, IK3 independently of one another. The output signals of the electrical current setting channels Ch1, Ch2, Ch3 must be made available to the voter V. In order to assure that also in the case of the analog components of the electrical current setting module 1 a failure detection occurs, the outputs of the electrical current controller units 5.1, 5.2, 5.3 must be made available to the voter V. Since it is not possible directly to measure the electrical currents at the transistors Q2, Q4, Q7, the output signals of the operational amplifiers U2A, U3A, U4A are used. The corresponding output signals are labeled in FIGS. 5 and 6 with Ch1, Ch2, Ch3.

As already mentioned above, it is with the solution of the invention possible to assure the correct operation of the field device even when a measurement- or electrical current setting channel MK, IK is lost. As soon as an electrical current value deviating from the desired value is detected in one of the measurement- or electrical current setting channels MK, IK and, thus, a malfunction Fch has occurred, the malfunctioning measurement- or electrical current setting channel MK, IK is switched off. Its function is automatically assumed by one of the remaining measurement- or electrical current setting channels MK, IK.

In order to detect the malfunction, a voter channel VK1, VK2, VK3 is associated with each electrical current setting channel IK1, IK2, IK3. Each voter channel VK1, VK2, VK3 is part of the doubly redundant voter V and is composed of a comparator stage 11.1, 11.2, 11.3 and a failure detection stage 10.1, 10.2, 10.3. Each comparator stage 11 includes two comparator modules 12, which, in turn, have two comparators 18 and two voltage dividers 16. Since the signals, which are fed to the comparators 18, are analog signals, the comparators 18 must be analog components. This has the advantage that a malfunction Fch is detected directly after its occurrence and the switching on of one of the remaining electrical current setting channels IK can likewise occur without time delay. In this way, a seamless transition and therewith a continuous operation of the field device are assured.

Each comparator module 12 is composed, such as already stated, of two analog comparators 18 and two voltage dividers 16. The tolerance in the case of comparison of the accuracies of the channels corresponds essentially to the accuracy of the measurement channel MK with the least accuracy. Preferably, the tolerance lies at one percent of the current measured value. The measurement channel MK with the least accuracy is, in principle, the analog measurement channel MK. The output of a comparator stage 11 signals the difference between two signals, which difference is greater than 1%.

As a formula, this can be expressed as follows:

$(CH3 \neq CH1)$ is true, when
$\overline{(CH3 > Ch1 \times 0.99) \wedge (Ch1 > Ch3 \times 0.99)}$, wherein
the tolerance amounts to 1.01%/−1%.

Moreover, for correct calculation, also the tolerances of the comparators 12 and the resistors of the voltage divider 16 must be taken into consideration. Assuming that the components have an ideal behavior and, thus, no deviations, the factor 0.99 is applied to the sizes of the resistors of the voltage divider 16. For example, R40 amounts to 470 kΩ and R41 to 4.7 kΩ.

The comparator stages 11 are connected with the failure detection stages 10, which detect, in which of the measurement- or electrical current setting channels MK, IK a malfunction has occurred. If, for example, $(Ch1 \neq Ch2) \wedge (Ch1 \neq Ch3)$, then a malfunction has occurred in channel IK1. The failure detection stage 10.1 controls the corresponding turn off stage 9.1 in such a manner that the electrical current controller unit 7.1 of the channel IK1, in which the malfunction is present, is turned off.

Figure 6:
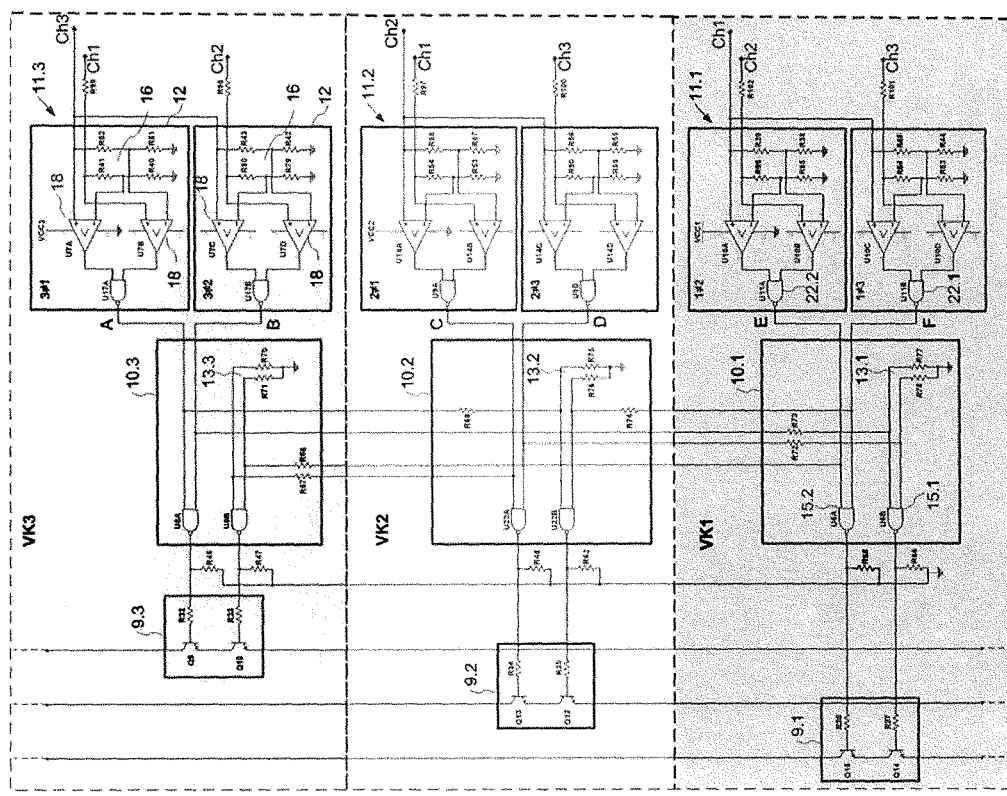
FIG. 6 is an enlarged view of the doubly redundant, safe voter with comparator stages, failure detection stages and turn off stages of FIG. 3.
Figure 7:
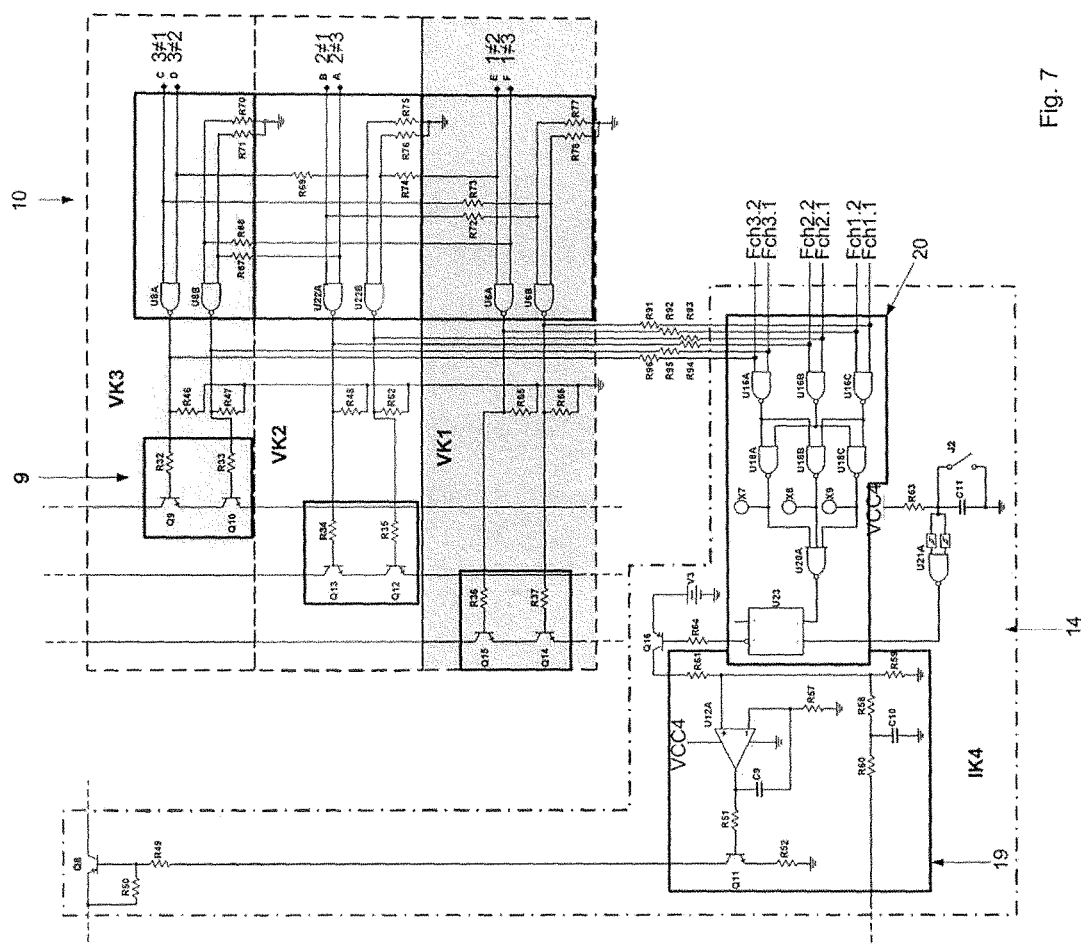
FIG. 7 is an enlarged view of the doubly redundant, safe voter with failure detection stages, turn off stages and an alarm electrical current module of FIG. 3.

As is evident from FIGS. 6 and 7, the voter V is doubly redundant. Voter V permits reliable detection of a malfunction Fch occurring in one of the electrical current setting channels IK, even in the case that the malfunction Fch occurs in a component of the voter V, thus either in the comparator stage 11, the failure detection stage 10 or in the turn off stage 9 of any electrical current setting channel IK. In case some component in one of the electrical current setting channels IK is lost, then the setting function is assumed by one of the remaining electrical current setting channels IK—the ability of field device to function is, thus, assured even in the case of occurrence of a malfunction in one of the electrical current setting channels IK. Of course, according to the invention, also failures are recognized, which occur in the upstream connected measurement channels MK.

The analogy embodied, doubly redundant voter V is so embodied that it also continues to work in the case of failure of the voltage supply in a channel IK. Thus, the field device remains operationally ready. If a voltage supply fails, then the electrical current controller 5/electrical current setting unit 7 of the affected channel IK is lost. The function of the affected channel IK is assumed by one of the remaining channels IK. Since the failure detection stage 10 of a channel IK obtains information from the comparators 12 of the other channels IK, it is important that a channel IK in the case of elimination of the voltage does not influence the other channels IK. Therefore, the failure detection stage 10 is provided with pull-down resistors 13. Each pull down resistor 13 is connected between a signal line and ground potential and assures that the signal is set to a defined level, when an electrical current setting channel IK is switched off and the control unit is lost due to the turning off of an electrical current setting channel IK. So long as the control unit correctly works, the pull down resistances 13 have no influence on the signal, since they are relatively high resistance. The pull down resistances 13 assure that a correctly working electrical current setting channel IK is not switched off when the voltage supply in one of the other electrical current setting channels IK is lost. Moreover, there are provided in each of the electrical current setting channels IK voltage monitoring elements, which detect over- or under voltages. A voltage monitoring element can in the case of occurrence of a malfunction turn off the energy supply of the affected electrical current setting channel IK.

Details of FIG. 6 will now be explained. Each voter channel VK includes a part of the comparator stage 11, a part of the failure detection stage 10 and a part of the turn off stage 9. Each voter channel VK is embodied as an integrated component of the associated measurement channel MK and the associated electrical current setting channel IK.

With reference to the voter channel VK1, the comparator stage 11.1 includes two comparator modules 12, which compare the output signals Ch1 of the associated electrical current setting channel IK1 with the output signals Ch2, Ch3 of the remaining electrical current setting channels IK2, IK3. The output signals of the two comparators 18 of each of the comparator modules 12 form the input signals for the downstream NAND gate 22.1 and the downstream NAND gate 22.2. The output signals F, E of the NAND gate 22.1 and the NAND gate 22.2 are the supplied to the failure detection stage 10.1.

In the failure detection stage 10.1 downstream from the comparator stage 11.1, it is ascertained, in which of the measurement- or electrical current setting channels MK, IK a malfunction has occurred. The failure detection stages 10.1, 10.2, 10.3 are logic stages composed of two NAND gates 15.1, 15.2. Let us consider in the following the first voter channel VK1 somewhat more exactly: On the inputs of the first NAND gate 15.2 lie the output signals E, F of the comparator stage 11.1 of the first voter channel VK1. The first voter channel VK1 is associated with the first measurement channel MK1. On the inputs of the second NAND gate 15.1 lie the redundant output signals B, D of the comparator stages 11.2, 11.3 of the second voter channel VK2 and of the third voter channel VK3. The output signals of the first NAND gate 15.2 and the second NAND gate 15.1 form the control signals for the downstream turn off stage 9.1. So long as at least one input signal of the first NAND gate 15.2 and at least one input signal of the second NAND gate 15.1 are at the logic "0" state, nothing happens. As soon as the two input signals of the first NAND gate 15.2 or the two input signals of the second NAND gate 15.1 are at the logic "1" state, the corresponding electrical current setting channel IK1 is immediately turned off by the corresponding turn off stage 9.1. Analogous considerations hold for the two additional electrical current setting channels VK2, VK3.

If the control/evaluation unit 6 is embodied as a dynamically reconfigurable or a reconfigurable or simple only as an FPGA and two channels MK, IK are implemented in the FPGA, then the two channels MK, IK are connected to one voltage supply. Therefore, the electrical current supply of an individual channel MK, IK cannot be turned off.

FIG. 7 shows the alarm electrical current module 14 together with the failure detection stages 10.1, 10.2, 10.3 and the turn off stages 9.1, 9.2, 9.3. The alarm electrical current module 14 is so embodied that it can detect multiply occurring malfunctions Fch in different measurement channels MK or electrical current setting channels IK. In principle, the alarm electrical current module 14 is a fourth electrical current setting channel IK4, which can be so triggered that it sets a failure current of ≥22 mA, the so-called alarm electrical current. The triggering occurs via the driver 20 for the alarm electrical current control 19. Since this alarm electrical current in a 4-20 mA electrical current loop is greater than all other electrical currents flowing in the analog electrical current interface 8, the control is automatic. The alarm electrical current module 14 is preferably fed from its own voltage supply VCC4.

The alarm electrical current module 14 is controlled according to an algorithm, which is brought together in the following formulas and implemented in FIG. 7 by a logic stage. An alarm electrical current is set, when a malfunction occurs in at least two channels simultaneously. In such case, FchX·Y=1 stands for a failure in the measuring/electrical current setting channel X detected by the failure detection stage Y. The algorithm is expressed as a formula as follows:

$$((Fch1.1 \vee Fch1.2) \wedge (Fch2.1 \vee Fch2.2)) \vee$$

$$((Fch1.1 \vee Fch1.2) \wedge (Fch3.1 \vee Fch3.2)) \vee$$

$$((Fch2.1 \vee Fch2.2) \wedge (Fch3.1 \vee Fch3.2))$$

The alarm electrical current module 14, thus, detects at least two simultaneously occurring failures, which occur in two different measurement channels MK and/or electrical current setting channels IK. The alarm electrical current module 14 can also be triggered by other modules, such as, for example, by a voltage monitoring unit or by reconfiguration controls. These embodiments are not shown in FIG. 7. The signals of the failure detection stages 10 are preferably forwarded to the reconfiguration control, which initiates reconfiguration of defective measurement channels MK. This is shown and described in the above mentioned DE 10 2012 106 652.3 in its FIGS. 1, 2 and 3.

Essential differences with reference to the present invention are that the voter V in the case of the present invention is implemented in the analog electrical current interface 8 and that the electrical current interface 8 is redundant.

The invention claimed is:

1. A field device for determining or monitoring a process variable in automation technology, wherein the field device meets a safety standard, which is required in a predetermined safety-critical application, comprising:
   a sensor, which works according to a defined measuring principle;
   a control/evaluation unit, which processes and evaluates measurement data delivered by said sensor along at least three redundant and/or diversely designed measurement channels; and
   a redundant analog electrical current interface, via which an electrical current representing the process variable is settable in a two-wire line, wherein: said redundant analog electrical current interface is designed triply redundantly; and
   the following components are associated with said redundant analog electrical current interface:
   three electrical current setting channels connected in parallel;
   a doubly redundant voter, which detects a malfunction in one of said measurement channels and/or said electrical current setting channels; and
   a doubly redundant turn off stage, via which one of said measurement channels, respectively one of said electrical current setting channels, is turned off, when said doubly redundant voter detects a malfunction in said one of said measurement channels or in one of said electrical current setting channels.

2. The field device as claimed in claim 1, wherein:
   each electrical current setting channel includes an electrical current setting unit and an electrical current controller; and
   said electrical current setting unit and said electrical current controller in each electrical current setting channel is connected in parallel.

3. The field device as claimed in claim 1, wherein:
   said voter is composed of a plurality of components, which are at least partially or completely doubly redundantly designed.

4. The field device as claimed in claim 1, wherein:
   said voter is a majority voter, which has a plurality of voter channels, each voter channel contains components as follows: a comparator stage, via which output signals delivered by the individual electrical current setting channels are compared with one another; a failure detection stage, which by suitable combining of the output signals of said comparator stages associated with said voter channels detects a malfunction occurring in a measurement channel or in an electrical current setting channel; and a turn off stage, which turns off said electrical current setting channel, in which said failure detection stage detects a malfunction.

5. The Field device as claimed in claim 1, wherein:
   each voter channel includes a part of said comparator stage, a part of said failure detection stage and a part of said turn off stage; and
   each voter channel is embodied as an integrated component of the associated measurement channel and of the associated electrical current setting channel.

6. The field device as claimed in claim 1, wherein:
   said comparator stage for each voter channel has two comparator modules, which compare the output signals of the associated electrical current setting channel with the output signals of the remaining electrical current setting channels.

7. The field device as claimed in claim 5, wherein:
   each of said failure detection stages is a logic stage, which is constructed of two NAND gates;
   applied to the inputs of said first NAND gate are the output signals of said comparators of a first voter channel, which is associated with a selected measurement channel;
   applied to said second NAND gate are the output signals of said comparators of said second voter channel and of the third voter channel redundant to the inputs of said first NAND gate, and;
   the output signals of said first NAND gate and said second NAND gate form the control signals for said turn off stage.

8. The field device as claimed in claim 1, wherein:
   each measurement channel/electrical current setting channel has its own voltage supply.

9. The field device as claimed in claim 1, further comprising:
   an alarm electrical current module, which is so embodied that it sets a failure current, when in at least two measurement channels, respectively in two electrical current setting channels, malfunctions occur simultaneously.

10. The field device as claimed in claim 1, wherein:
    said control/evaluation unit with measurement channels/electrical current setting channels, and the associated components of said voter, respectively said voter channels, is at least partially embodied as a reconfigurable logic chip with a number of partially dynamically reconfigurable function modules in the measurement channels electrical current setting channels.

11. The field device as claimed in claim 1, further comprising:
    a reconfiguration control, which configures function modules in said measurement channels or in said electrical current setting channels as a function of the respectively defined safety-critical application that the field device meets the required safety standard.

12. The field device as claimed in claim 11, wherein:
there is associated with said reconfiguration control at least one microprocessor, which partially dynamically reconfigures the function modules of a measurement channel or an electrical current setting channel, in which a failure is detected.

13. The field device as claimed in claim 1, wherein:
at least one of said measurement channels or electrical current setting channels is configured analog-based in an FPAA.

14. The field device as claimed in claim 1, wherein:
said individual measurement channels or electrical current setting channels are so spaced from one another that a temperature- and/or a stress or voltage change in a measurement channel or electrical current setting channel have/has no influence on a neighboring measurement channel or electrical current setting channel.

15. The field device as claimed in claim 1, wherein:
said at least one microprocessor is permanently configured in a static region of the logic chip (FPGA).

* * * * *